April 20, 1943.    A. L. PARKER    2,316,806
TUBE COUPLING
Filed March 14, 1941
Fig.1.
Fig.2.
Fig.3.
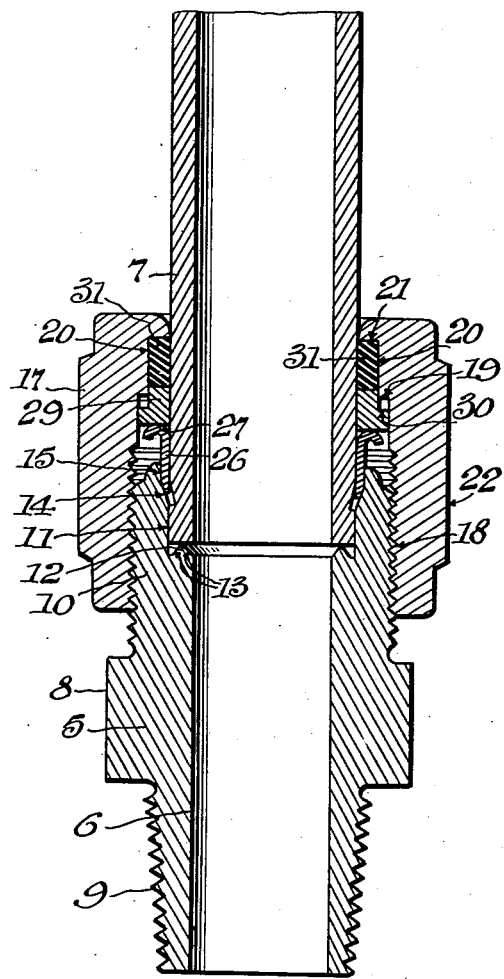
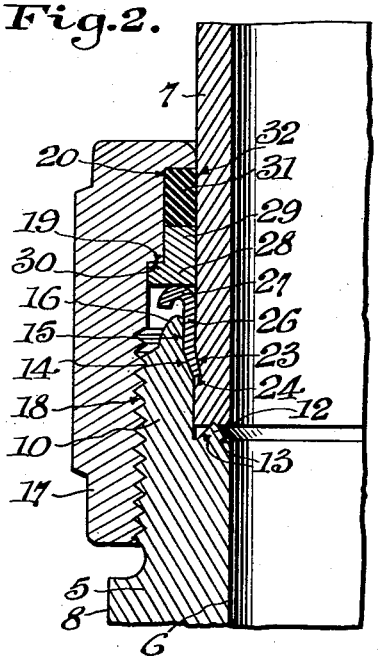
Inventor
Arthur L. Parker
By Mason & Porter
Attorneys Patented Apr. 20, 1943

2,316,806

UNITED STATES PATENT OFFICE 2,316,806

TUBE COUPLING

Arthur L. Parker, Cleveland, Ohio

Application March 14, 1941, Serial No. 383,420

3 Claims. (Cl. 285—167)

The invention relates generally to tube couplings in which a tube is securely clamped at its end between threadably engaged male and female elements, and it primarily seeks to provide a novel form of coupling in which the clamping of the tube is effected by a ferrule surrounding the tube between the male and female elements and which is caused to securely clamp the tube and seal the joint by movement imparted thereto by tight threading of said elements one onto the other.

An object of the invention is to provide a coupling of the character stated in which is included means other than the ferrule and spaced longitudinally therefrom for yieldably gripping the coupled tube and dampening vibrations therein.

Another object of the invention is to provide a coupling of the character stated including a novel yieldable and non-yielding ring combination movable by threading together of the male and female coupling elements to first effect compression of the yieldable ring and the vibration dampening gripping thereby of the tube and then cause the non-yielding ring to force the ferrule into tube sealing and clamping contact with the tube.

With the above and other objects in view that will hereinafter appear, the nature of the invention will be more fully understood by following the detailed description, the appended claims, and the several views illustrated in the accompanying drawing.

In the drawing:

Figure 1 is a central longitudinal sectional view illustrating the improved tube coupling, the loosely assembled condition of the coupling being shown.

Figure 2 is an enlarged fragmentary sectional view of the coupling illustrating the normal assembly condition thereof.

Figure 3 is a view similar to Figure 2 and illustrates an abnormal pressure assembly condition of the coupling.

In the example of embodiment of the invention illustrated in the accompanying drawing, the male element 5 is provided with an axial bore 6 of substantially the same diameter as the inside diameter of the tube 7 which is to be coupled. The male element includes a non-circular body portion 8 from one end of which extends an externally threaded and tapered mounting portion 9, and from the other end of which extends an externally threaded female element receiving extension 10. The male element 5 is counterbored as at 11, and this counterbore provides a tube end abutment shoulder which takes the form of an annular, line contact ridge 12 defined by upwardly converging wall portions 13. The seating ridge 12 thus formed is presented for line contact with the end of a tube receivable in the male element counterbore 11 within the wall thickness of tubes which might be so inserted. In other words, the seating ridge 12 is placed so as to be effective over a wide range of tube wall thicknesses, it being understood that tubes of varied wall thicknesses may be used in the improved coupling.

The male element counterbore 11 also includes a flared enlargement or extension 14 which merges into a cylindrical bore enlargement or counterbore extension 15, and the male element extension 10 terminates in a reduced diameter nose or end extension 16 within which said enlargement or counterbore 15 is formed. It will be observed that the external diameter of the nose or extension 16 is considerably smaller than the externally threaded portion 10 of the male element, thereby to provide a space or chamber surrounding said nose or extension 16 when the male and female elements are assembled in the manner illustrated in Figures 1 to 3 of the drawing.

The female element 17 includes an internally threaded bore 18 which is threadable onto the externally threaded extension 10 of the male element. The internally threaded bore 18 of the female element terminates at its upper end in a transverse abutment shoulder 19, and the female element is counterbored as at 20 to provide a clamp ring chamber surrounding the tube 7 and a transverse abutment shoulder 21 forming the upper limit of said chamber. The usual non-circular nut portion of the female element is indicated at 22.

At a point spaced longitudinally from its end extremity, the tube 7 is provided with a tapered cut or reduction 23 which serves to provide an abrupt abutment and joint sealing shoulder 24 within the diametrical limits of said tube. The shoulder 24 is engageable by the blunt end 25 of a clamping ferrule or ring 26 which is initially shaped in the form of a thin metallic shell, as indicated in Figure 1, and including an outwardly and downwardly curled top portion 27 adapted to be engaged by a metal clamping ring 28 having a reduced diameter portion 29 receivable in the female element counterbore 20 and which serves to provide an abutment shoulder 30 presented for engagement by the abutment shoulder 19 of said female element. Within the chamber 20 in the female element, and above the metal clamping ring 28, a yieldable clamping ring 31, preferably formed of rubber, is mounted.

It will be observed that the counterbore 15 within the nose extension 16 is spaced outwardly from the external surface of the tube 7 a distance sufficient to accommodate the positioning of the ferrule 26 so as to receive the lower end of the ferrule between the reduced diameter nose 16 and the outer surface of the tube 7.

In forming the coupling, the parts are assembled in the manner illustrated in Figure 1, and this figure indicates the loosely assembled condition of the coupling before the actual clamping of the tube has been effected. In this initial positioning of the parts, the curled upper end 27 of the ferrule is in engagement with the under surface of the metal ring 28.

As the female element is threaded home on the male element extension 10, the first effect of this movement is to cause the reduced diameter portion 29 of the ring 28 to move upwardly in the counterbore 20 and compress the yieldable ring 31 into vibration dampening contact with the external surface of the tube 7 as at 32. Compression of the ring 31 terminates when the abutment shoulders 19 and 20 engage, and continued threading of the female element 17 will cause the metal ring 28 to force the ferrule 26 downwardly and the lower extremity of the ferrule to be displaced inwardly by the flared wall portion 14 to bring the blunt end 25 thereof into tube clamping and sealing contact with the tube abutment shoulder 24 in the manner illustrated in Figure 2.

The longitudinal movement of the ferrule under pressure of the transverse face of the ring 28 is effected without distortion or displacement of the main body of the ferrule because of the confining effect of the counterbore extension 15 within the reduced diameter nose 16 of the male element, and when the end extremity of the ferrule is pressed forcibly against the abutment shoulder 24, the lower extremity of the tube 7 is pressed tightly against the annular ridge 12 causing the latter to impinge slightly in line contact in the end wall thickness of said tube.

Should the operator apply the female element too tightly, or continue the couple clamping action beyond the normal position illustrated in Figure 2, the reduced diameter of the nose 16 offers freedom for the downwardly curled extremity of the ferrule portion 27 and assures against undesirable displacement or distortion of parts by permitting said ferrule extremity to curl additionally into the space surrounding said nose in the manner illustrated in Figure 3 of the drawing.

By providing the compressible ring 31, the tube is yieldably gripped at a point longitudinally spaced from the abutment and sealing shoulder 24 of the tube, and tube vibrations are thus dampened in a manner for minimizing breakage of tubes within the coupling.

The coupling as shown, described, and claimed, embodies improvements in the couplings disclosed in my copending applications Serial No. 262,965, filed March 20, 1939, and Serial No. 305,371, filed November 20, 1939. It is obvious that the feature of structure whereby the ferrule clamps the tube so as to dampen vibrations, and the feature of structure wherein the seat is so formed as to make line contact with the end of the tube over a wide range of tube wall thickness, may be used in connection with a ferrule construction having a sharp edge which cuts into the tube and forms a holding shoulder, as set forth in my companion application Serial No. 262,965. It is also obvious that the sleeve may be placed on the tube having a pre-formed shoulder and contracted so as to be brought into engagement therewith prior to the placing of the tube in the coupling in which the camming shoulder will positively hold the coupling in engagement with the shoulder when wrench pressure is applied for the clamping of the tube.

It is, of course, to be understood that the details of structure and arrangement of parts may be variously changed and modified without departing from the spirit and scope of my invention.

Having thus described the invention, what I claim as new and desire to secure by Letters Patent, is:

1. A coupling for tubes comprising a body member having a bore to receive the tube end and a seat within the bore for the end of the tube, a metal sleeve surrounding the tube and having positive gripping engagement with the tube for pressing the same endwise into sealing engagement with the seat on the body member, a ring surrounding the tube and engaging the outer end of said sleeve, a deformable gasket surrounding the tube and engaging the outer end of said ring, a nut having threaded engagement with the body member and recessed to receive the ring and gasket, said nut having a shoulder engaging the gasket and compressing the same against the ring for expanding the gasket into engagement with the tube for damping vibrations therein, said nut having a second shoulder engaging the ring for positively forcing the sleeve and tube endwise against the seat.

2. A coupling for tubes comprising a body member having a bore to receive the end of the tube, a seat within the bore for the tube end and a camming surface at the entrance to the bore, a metal sleeve surrounding the tube, a ring surrounding the tube and adapted to engage the outer end of the sleeve for forcing the same into engagement with the camming surface whereby said sleeve is contracted and caused to grip the tube and move the same endwise into sealing engagement with the seat on the body member of the coupling, a deformable gasket surrounding the tube and adapted to engage the outer end of the ring, a nut having threaded engagement with the body member and recessed to receive the ring and gasket, said nut having a shoulder adapted to engage the gasket for compressing the same against the ring whereby the gasket is expanded into engagement with the tube for damping vibrations therein, said nut having a second shoulder adapted to engage the ring, which last-named shoulder and ring are initially out of engagement until the gasket is compressed to a proper degree, after which said shoulder and ring are brought into engagement for positively forcing the tube endwise into tight sealing engagement with the seat on the body member.

3. A coupling for tubes comprising a body member having a bore to receive the end of the tube and a seat within the bore for the tube end, a metal sleeve surrounding the tube and adapted to make positive gripping engagement with the tube for moving the same endwise, a ring surrounding the tube and adapted to engage the outer end of the sleeve, a deformable gasket surrounding the tube and adapted to engage the outer end of the ring, a nut having a threaded engagement with the body member and recessed at its outer end to receive and house the deformable gasket, said nut having a recess of larger diameter to receive the ring and sleeve and provide a shoulder between the recesses, said ring having a portion fitting into the recess containing the deformable gasket, and a shoulder for engagement with the shoulder on the nut, said shoulders being initially out of engagement until the gasket is compressed to a proper degree after which said shoulders are brought into engagement for positively forcing the tube endwise into tight sealing engagement with the seat on the body member.

ARTHUR L. PARKER.